United States Patent [19]

Flannery et al.

[11] Patent Number: 4,536,481
[45] Date of Patent: Aug. 20, 1985

[54] OPAL GLASSES HAVING AN APATITE OPACIFYING PHASE

[75] Inventors: James E. Flannery, Corning; John L. Stempin, Beaver Dams; Dale R. Wexell, Corning, all of N.Y.

[73] Assignee: Corning Glass Works, Corning, N.Y.

[21] Appl. No.: 592,960

[22] Filed: Mar. 23, 1984

[51] Int. Cl.$^3$ .......................... C03C 3/08; C03C 3/10; C03C 3/30
[52] U.S. Cl. ........................................ 501/32; 501/59; 501/61
[58] Field of Search ....................... 501/32, 59, 61, 62, 501/63

[56] References Cited

U.S. PATENT DOCUMENTS 2,394,502  2/1946  Weyl et al. ........................... 501/59
4,298,390  11/1981  Flannery et al. ..................... 501/32

FOREIGN PATENT DOCUMENTS 235256  1/1969  U.S.S.R. ............................... 501/32

*Primary Examiner*—Mark L. Bell
*Attorney, Agent, or Firm*—C. S. Janes, Jr.

[57] ABSTRACT

This invention is directed to spontaneous opal glasses containing an apatite opacifying phase and exhibiting a softening point of at least 740° C., excellent chemical durability, and a temperature interval between the high temperature crystallization liquidus and the emulsion liquidus greater than 50° C. The glasses consist essentially, in weight percent on the oxide basis, of

| $SiO_2$ | 50–63 | $Na_2O$ | 5.5–10 |
|---|---|---|---|
| $Al_2O_3$ | 10–14 | $K_2O$ | 0–10 |
| $P_2O_5$ | 3.5–7 | BaO | 0–10 |
| PbO | 2–12 | CaO | 0–2.5 |
| $B_2O_3$ | 1–4 | SrO | 0–8 |
| F | 1.5–4 | BaO + CaO + SrO At Least 3 mole % | |

3 Claims, No Drawings

OPAL GLASSES HAVING AN APATITE OPACIFYING PHASE

BACKGROUND OF THE INVENTION

Our U.S. Pat. No. 4,298,390 discloses the production of spontaneous opal glasses wherein the opacity is the result of crystallinity in the glass and $Ba_2F(PO_4)$ constitutes the predominant crystal phase. Those glasses are asserted to manifest softening points in excess of 710° C., a white opacity, excellent chemical durability, and to consist essentially, expressed in terms of weight percent on the oxide basis, of 6–10% $Na_2O$, 1–6% $K_2O$, 4–11% $BaO$, 9–18% $Al_2O_3$, 1–5% $B_2O_3$, 50–70% $SiO_2$, 3.5–7% $P_2O_5$, 1–4% F, and optionally up to 3.5% CaO and/or up to 5% total of MgO and/or SrO.

The patent explains that those glasses are characterized by a two-stage liquidus phenomenon; viz., a high temperature cloudiness or opacification, termed an emulsion liquidus or liquid-liquid phase separation, and the normal crystalline opal liquidus. Analysis of the phase separation found it to be rich in $Na_2O$, $BaO$, $P_2O_5$, and F. X-ray diffraction analysis of the crystalline opal phase identified the predominant crystal phase to be of a $Ba_2(OH)PO_4$ type. Nonetheless, because X-ray analysis does not distinguish between fluoride and OH, it was assumed that fluoride substituted for OH in the crystal, thereby leading to the crystals being described as $Ba_2F(PO_4)$. Minor amounts of $NaBaPO_4$ and other unidentifiable species were also detected.

Culinary ware and tableware are thermally tempered to improve the mechanical strength and thermal shock resistance thereof. Unfortunately, breakage of such ware produced according to the disclosure of U.S. Pat. No. 4,298,390 was not infrequently experienced during the thermal tempering procedure. Microscopic examination of the crystal phase indicated that a substantial number of the crystals attained relatively large dimensions with inclusions of such crystals exhibiting diameters in excess of 0.001" (~25 microns). Ware containing such large inclusions do not survive the thermal shock inherent in the air chill tempering process, viz., about 800° C. to room temperature.

A further and very extensive investigation of those glasses has determined that the crystallization mechanism is more complex than originally conjectured. This study demonstrated that, instead of a single crystallization liquidus, as discussed in U.S. Pat. No. 4,298,390, there appears to be a first or high temperature crystallization liquidus and a second or low temperature crystallization liquidus. Hence, at the high temperature crystallization liquidus at least one species of apatite-type crystal [classical formula $Ca_{10}F_2(PO_4)_6$] precipitates out of the molten glass, and at the low temperature crystallization liquidus at least one other species of apatite-type crystal is generated, as confirmed by X-ray diffraction data. Much solid solution is possible in the apatite structure which manifests itself in very minor changes in the X-ray diffraction pattern; i.e., the overall pattern is relatively indistinguishable from the general appearance of classical apatite. Hence, as used herein, apatite includes such solid solution crystals.

It was noted in U.S. Pat. No. 4,298,390 that the emulsion liquidus and crystallization opal liquidus data were obtained utilizing a hot stage microscope composite apparatus. Such apparatus relies upon the sensitivity of the eye of the observer and, therefore, involves a significant measure of subjectivity in the reported determinations. Accordingly, to remove the element of subjectivity, the emulsion and low temperature crystallization liquidi were determined on a number of the working examples of the patent employing laser reflectance measurements, that technique being founded in conventional laser reflectance spectroscopy. Thus, those liquidi are readily gained from laser reflectance or back scattering/temperature curves. The high temperature crystallization liquidus cannot normally be directly obtained from such curves because that deflection is hidden in the steep slope brought about by the emulsion phenomenon. Consequently, the high temperature crystallization liquidus is read from the laser reflectance or back scattering/temperature curve in the derivative mode.

Table A records the emulsion, high temperature crystallization, and low temperature crystallization liquidi (in °C.) measured on several of the working examples provided in Table I of the patent. The Example Nos. reflect those in Table I of the patent.

TABLE A

|  | 1 | 2 | 3 | 7 | 8 | 9 | 10 | 12 | 15 | 17 | 18 |
|---|---|---|---|---|---|---|---|---|---|---|---|
| Emulsion Liquidus | 1380 | 1400 | 1390 | 1380 | 1380 | 1370 | 1395 | 1380 | 1390 | 1400 | 1385 |
| High Temp. Liquidus | 1350 | 1365 | 1370 | 1350 | 1345 | 1345 | 1360 | 1350 | 1375 | 1370 | 1360 |
| Low Temp. Liquidus | 875 | 860 | 610 | 700 | 760 | 725 | 710 | 820 | 900 | 740 | 770 |

As can be observed, the interval between the emulsion liquidus and the high temperature crystallization liquidus is less than 50° C., often no more than 25° C. The above-mentioned extensive investigation of those glasses has indicated that, to prevent the formation of those large crystalline inclusions which can cause mechanical breakage of ware, the temperature range between the emulsion liquidus and high temperature crystallization liquidus must be expanded. That is the principal objective of the present invention.

SUMMARY OF THE INVENTION

We have found that the incorporation of about 2–12% by weight PbO to compositions similar to those disclosed in U.S. Pat. No. 4,298,390 can substantially eliminate the above-described large inclusions of apatite crystals while retaining the chemical and physical properties of those glasses. PbO significantly lowers the high temperature crystallization liquidus such that the interval between the high temperature crystallization and emulsion liquidi is expanded by at least 25° C. and, frequently, in excess of 50° C. Thus, the crystallization liquidus is generally reduced to 1325° C. and below. The emulsion liquidus will generally remain essentially invariant with PbO contents up to about 4%. At higher values the emulsion liquidus will be depressed to some extent, but the reduction in the high temperature crystallization liquidus will generally track that decrease, such that the degree of expansion in the interval between the liquidi will be maintained. Hence, rather than a spread of no more than about 50° C. and often no more than 25° C. between the liquidi, the addition of PbO opens the interval to greater than 50° C., usually at least 75° C., and occasionally in excess of 100° C. This enlargement in the range of temperature between the crystallization and emulsion liquidi means that the exposure of the glass to a temperature between those liquidi, which is mandatory for dense opacification, can be conducted at temperatures sufficiently above the high temperature crystallization liquidus to minimize nucleation and the subsequent growth of large crystalline inclusions.

The glasses of the instant invention exhibit softening points in excess of 740° C., excellent chemical durability, low values of heavy metal release, and consist essentially, expressed in terms of weight percent on the oxide basis, of:

| $SiO_2$ | 50–63 | $Na_2O$ | 5.5–10 |
|---|---|---|---|
| $Al_2O_3$ | 10–14 | $K_2O$ | 0–10 |
| $P_2O_5$ | 3.5–7 | BaO | 0–10 |
| PbO | 2–12 | CaO | 0–2.5 |
| $B_2O_3$ | 1–4 | SrO | 0–8 |
| F | 1.5–4 | | |

BaO + CaO + SrO at least 3 mole %

At least one member of the group CaO, SrO, and BaO must be present to yield an apatite opacifying phase selected from the group of $Ca_5F(PO_4)_3$, $Sr_5F(PO_4)_3$, $Ba_5F(PO_4)_3$, $(Ca_{5-x}Ba_x)F(PO_4)_3$ solid solution, $(Sr_{5-x}Ba_x)F(PO_4)_3$ solid solution, $(Sr_{5-x}Ba_x)F(PO_4)_3$ solid solution, $(Ca_{5-x}Sr_x)F(PO_4)_3$ solid solution, $(Ba_{5-x}Ca_x)F(PO_4)_3$ solid solution, and $(Ba_{5-x}Sr_x)F(PO_4)_3$ solid solution. All of those crystal species have the apatite structure with the general formula $R_5X(PO_4)_3$, wherein R is selected from the group of Ca, Sr, and Ba, and X is selected from the group of $F^-$ and $OH^-$. The minimum level required for each or a combination of two or more is expressed in terms of mole percent because of the obvious differences in the molecular weights of CaO, SrO, and BaO. The minimum quantities of CaO, SrO, and BaO necessary to achieve dense opacity, approximated in terms of weight percent, are about 1%, 2%, and 3%, respectively.

Scanning electron microscopy and X-ray emission data indicate that lead enters the separated phase to inhibit thereby the formation of the calcium and/or strontium and/or barium apatite crystals. Thus, here again is support for the suggestion that lead enters into the apatite phase to form an apatite solid solution containing lead and/or a lead apatite phase, viz. $Pb_5F(PO_4)_3$.

The most preferred levels of PbO to insure dense opacity, to minimize heavy metal release, to maintain the softening point above 760° C. to permit decorating with durable, high temperature glazes and enamels, to exhibit excellent resistance to attack by acids and bases, and to display extremely good detergent durability will comprise about 3–4%. Whereas PbO contents up to 12% are operable, the products resulting from those values do not manifest any substantial improvement in properties and the softening point may be reduced and chemical durability deleteriously affected. Opacity is also generally affected adversely. Quantities greater than 12% invariably result in reduced chemical durability and increased heavy metal release.

Each of the remaining base glass constituents will be constrained within the above-defined limits. For example, when the amount of CaO exceeds 2.5%, PbO becomes ineffective in controlling the size of the crystalline inclusions because of the great insolubility of calcium apatite under those conditions. Above 8% SrO the glasses display high emulsion liquidi with subsequent inclusion problems. BaO levels greater than 10% cause the coefficient of thermal expansion of the glass to become so high as to prevent satisfactory thermal tempering. At $P_2O_5$ levels below 3.5%, opacity becomes poor and where $P_2O_5$ is present in amounts greater than about 5, PbO cannot be counted upon to always control the growth of apatite inclusions. At least 1.5% F is necessary to form the desired fluorapatite structure, but quantities greater than 4% cause a decrease in opacity because the fluoride solubilizes the components of the apatite phase in the melt. About 1.8–2.2% F is preferred. The total $Na_2O + K_2O$ will preferably not exceed about 13% since their fluxing action solubilizes the crystal components which leads to reduced opacity. $K_2O$ is preferably present since its absence frequently results in a glass having an undesirably high emulsion liquidus.

PbO when present in the defined amounts of 2–12% in the inventive opal glass system will, without fail, reduce the size of the crystalline inclusions, but may not always totally eliminate them at the higher levels of CaO, SrO, BaO, and $P_2O_5$.

$Al_2O_3$ contents should be maintained between 10–14% to impart excellent detergent durability. Amounts in excess of 14% customarily lead to a decreased emulsion liquidus and reduced opacity. Where the $B_2O_3$ level is below 1%, the emulsion liquidus rises dramatically. On the other hand, contents of $B_2O_3$ greater than 4% produce non-crystalline fluorphosphate opal glasses of only medium opacity at best.

MgO and ZnO may form part of the glass composition in amounts not exceeding 2.5% by weight total. A combination of PbO with ZnO appears to enhance the inclusion-controlling capability of ZnO. Nevertheless, when the content of ZnO exceeds two mole percent, additions of PbO up to about 12% often result in a decrease of opacity.

In summary, PbO in the apatite opal glass compositions of the instant invention operates in accordance with the following factors:

(a) it can essentially eliminate the undesirable large apatite inclusions; i.e., it lowers the temperature for the appearance of inclusions (high temperature crystallization liquidus); and (b) it can maintain or lower the emulsion liquidus while expanding the temperature interval between the high temperature crystallization and emulsion liquidi; and (c) it can increase the rate at which the emulsion and crystallization phenomena occur.

It will be appreciated, of course, that conventional glass coloring transition metal oxides and/or rare earth metal oxides may, if desired, be incorporated into the glass compositions in the customary proportions.

RELATED APPLICATION

Ser. No. 592,929, filed concurrently by us under the same title as the instant application, discloses that the incorporation of ZnO in compositions similar to those of U.S. Pat. No. 4,298,390 and similar to those of the instant application can eliminate the large crystalline inclusions in like manner to the action of PbO.

PRIOR ART

U.S. Pat. No. 4,298,390 provides an extensive recital of U.S. patents having some relevance to spontaneous fluorophosphate opal glasses and two other U.S. patents were cited during the prosecution of the application maturing into that patent. Rather than repeating that recital, however, the text of the patent is explicitly incorporated herein by reference. Whereas none of the patents reported therein or cited during the prosecution thereof is as pertinent to the present disclosure as U.S. Pat. No. 4,298,390, the instant invention being an improvement upon the latter, U.S. Pat. No. 2,394,502 will be reviewed inasmuch as it discloses the production of opal glasses containing a fluorapatite crystalline opal phase.

That patent describes opal glasses having base compositions consisting essentially, in weight percent, of:

| | | | |
|---|---|---|---|
| $SiO_2$ | 54–66 | PbO | 0–5 |
| $Al_2O_3$ | 0–6 | $B_2O_3$ | 0–50 |
| $Na_2O + K_2O$ | 12–17 | $As_2O_3$ | 0–1 |
| CaO | 0–12 | $P_2O_5$ | 4–9 |
| BaO | 0–4 | F | 2.5–5 |

No minimum quantity of CaO+BaO+PbO is specified, although it is noted that at least one of the three must be present to participate in the formation of the fluorapatite crystals. CaO is the preferred oxide. It is stated that BaO and PbO reduce crystal formation growth.

The maximum $Al_2O_3$ content is considerably below that required in the present inventive composition. Furthermore, BaO is stated to adversely affect crystal formation such that the maximum that can be tolerated is 4%. In contrast, the formation of crystals is not adversely affected by BaO in the present composition, and the minimum demanded to achieve dense opacity is about 3%.

DESCRIPTION OF PREFERRED EMBODIMENTS

Table I records exemplary compositions, expressed in terms of parts by weight on the oxide basis, illustrating the compositional parameters of the inventive glasses. Because the sum of the individual components totals or very closely approximates 100, for all practical purposes the values tabulated may be considered to represent the compositions in terms of weight percent. Furthermore, inasmuch as it is not known with which cation(s) the fluoride is combined, it is simply recited as fluoride (F), in accordance with conventional glass analysis practice. Commonly, about 20–30% by weight of the fluoride will be lost through volatilization during melting of the batch. Where desired, an oxide of arsenic or a chloride salt may be included in the batch to perform its conventional function as a fining agent. Table IA lists the components of the several glasses in terms of approximate mole percent.

The actual batch components may comprise any ingredients, either the oxides or other compounds, which, when melted together, will be converted into the desired oxide in the proper proportions. The fluoride will typically be added as a silicofluoride. Whereas the description below is based upon laboratory scale melting, it must be recognized that the tabulated compositions would also be useful in large scale commercial melting units.

The batch ingredients were compounded, tumble mixed together to assist in obtaining a homogeneous melt, and charged into platinum crucibles. The crucibles were introduced into a furnace operating at about 1500° C. and the batches melted for about four hours. The melts were poured into steel molds to yield slabs having the dimensions of 3.5"×2.5"×0.25", and the glass slabs immediately transferred to an annealer operating at 500°–550° C., the slabs being cooled to room temperature at a rate of about 50° C./hour.

Table I also reports visual appraisal of the density of the opacity (Opac.), the presence of inclusions (Incls.) in the slabs, and the identity of the crystal phase(s) present (Cryst.) as determined via X-ray diffraction data, listed in the order of extent present.

TABLE I

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| $SiO_2$ | 58.75 | 56.9 | 55.5 | 56.3 | 58.1 | 56.35 | 54.7 | 51.7 | 59.4 | 58.6 | 57.2 | 59.35 | 58.0 | 58.2 | 58.0 | 57.8 | 55.6 | 56.5 | 58.9 | 57.85 | 58.6 | 57.3 | 58.8 | 57.6 |
| $Al_2O_3$ | 15.4 | 14.95 | 14.6 | 14.8 | 12.8 | 12.4 | 12.1 | 11.4 | 13.2 | 12.9 | 12.6 | 13.1 | 12.9 | 12.8 | 12.8 | 12.7 | 12.25 | 13.0 | 13.0 | 12.7 | 12.9 | 12.6 | 12.9 | 12.7 |
| CaO | 4.05 | 3.1 | 2.3 | 0.8 | 1.55 | 1.5 | 1.5 | 1.4 | 1.7 | 0.8 | — | 1.6 | 1.6 | 1.55 | 4.3 | — | — | — | 1.6 | 1.55 | 1.6 | 1.55 | 1.6 | 1.55 |
| BaO | — | — | — | — | 6.4 | 6.2 | 6.0 | 5.7 | 6.7 | 6.45 | 6.3 | 4.35 | 2.2 | — | 8.2 | 2.15 | 7.9 | 6.2 | 6.5 | 6.4 | 6.45 | 6.3 | 6.5 | 6.35 |
| $Na_2O$ | 8.5 | 8.3 | 8.1 | 8.2 | 8.2 | 7.95 | 7.7 | 7.3 | 8.7 | 8.3 | 8.1 | 8.4 | 8.3 | 8.2 | 8.2 | 8.2 | 3.15 | 7.5 | 8.3 | 8.2 | 7.4 | 6.4 | 7.8 | 7.3 |
| $K_2O$ | 1.95 | 1.9 | 1.85 | 1.9 | 3.3 | 3.2 | 3.1 | 2.9 | — | 3.3 | 3.25 | 3.35 | 3.3 | 3.3 | 3.3 | 3.3 | 4.0 | — | 2.0 | 0.65 | 3.3 | 3.25 | 2.65 | 1.95 |
| $P_2O_5$ | 4.5 | 4.3 | 4.25 | 4.3 | 4.15 | 4.0 | 3.9 | 3.7 | 4.3 | 4.2 | 4.1 | 4.25 | 4.2 | 4.15 | 4.15 | 4.15 | 4.0 | 4.1 | 4.2 | 4.15 | 4.2 | 4.1 | 4.2 | 4.1 |
| $B_2O_3$ | 3.45 | 3.3 | 3.3 | 3.3 | 2.4 | 2.35 | 2.3 | 2.15 | 2.7 | 2.45 | 2.4 | 2.5 | 2.45 | 2.4 | 2.4 | 2.4 | 2.3 | 2.5 | 2.45 | 2.4 | 2.45 | 2.4 | 2.45 | 2.4 |
| PbO | 3.35 | 6.5 | 9.5 | 9.6 | 3.1 | 6.0 | 8.8 | 13.8 | 3.2 | 3.1 | 6.1 | 3.2 | 6.3 | 9.3 | 6.2 | 9.3 | 14.9 | 6.1 | 3.15 | 6.2 | 3.15 | 6.1 | 3.15 | 6.15 |
| F | 2.28 | 2.2 | 2.15 | 2.18 | 2.12 | 2.05 | 1.99 | 1.9 | 2.2 | 2.1 | 2.1 | 2.2 | 2.15 | 2.1 | 2.1 | 2.1 | 2.0 | 2.3 | 2.15 | 2.1 | 2.15 | 2.1 | 2.15 | 2.1 |
| MgO | 0.9 | 0.87 | 0.85 | 0.86 | — | — | — | — | — | — | — | — | — | — | — | — | — | — | — | — | — | — | — | — |
| Incls. | No | No | No | No | No | No | No | No | No | No | No | No | No | No | No | No | No | Few | No | No | No | No | No | No |
| Opac. | Medium | Medium | Very Dense | Poor | Dense | Dense | Dense | Dense | Dense | Medium | Poor | Poor | Medium | Medium | Medium Dense | Poor | Poor | Very Dense | Very Dense | Very Dense | Very Dense | Very Dense | Dense | Very Dense |
| Cryst. | — | — | Apatite | Apatite | Apatite | — | — | Apatite | Apatite | — | — | — | Apatite | — | Apatite | — | — | Apatite | Apatite | Apatite | Apatite | Apatite | — | Apatite |

| | 25 | 26 | 27 | 28 | 29 | 30 | 31 | 32 | 33 | 34 | 35 | 36 | 37 | 38 | 39 | 40 | 41 | 42 | 43 | 44 |
|---|---|---|---|---|---|---|---|---|---|---|---|---|---|---|---|---|---|---|---|---|
| $SiO_2$ | 59.9 | 58.55 | 57.25 | 59.3 | 58.0 | 58.0 | 58.2 | 59.15 | 57.5 | 58.7 | 56.85 | 58.2 | 56.3 | 54.9 | 57.5 | 55.6 | 53.65 | 57.0 | 53.0 | 58.25 |
| $Al_2O_3$ | 13.2 | 12.9 | 12.6 | 13.0 | 12.75 | 12.75 | 12.8 | 13.0 | 12.65 | 12.9 | 12.5 | 12.9 | 12.5 | 12.15 | 12.75 | 13.6 | 13.75 | 13.3 | 13.7 | 12.8 |
| CaO | 1.45 | 1.3 | 1.1 | 1.6 | 1.55 | 1.4 | 1.4 | 1.6 | 1.55 | 1.6 | 1.5 | 1.2 | 0.4 | — | 1.55 | 1.5 | 1.45 | 1.55 | 1.45 | 1.55 |
| BaO | 6.6 | 6.45 | 6.3 | 6.5 | 6.4 | 5.1 | 5.85 | 5.4 | 3.2 | 6.5 | 6.3 | 5.4 | 3.15 | — | — | 6.1 | 5.9 | 6.3 | 5.9 | — |
| $Na_2O$ | 6.85 | 6.0 | 5.2 | 6.35 | 5.5 | 7.25 | 7.5 | 8.35 | 8.1 | 8.3 | 8.0 | 8.3 | 8.0 | 7.8 | 8.16 | 7.85 | 7.6 | 8.1 | 7.5 | 8.2 |
| $K_2O$ | 2.0 | 2.0 | 1.95 | 1.7 | 1.5 | 2.9 | 3.0 | 2.65 | 1.3 | 3.3 | 3.2 | 3.3 | 3.2 | 3.15 | 3.25 | 3.15 | 3.0 | 3.25 | 3.0 | 3.3 |
| $P_2O_5$ | 4.3 | 6.25 | 4.1 | 4.25 | 4.15 | 4.15 | 4.15 | 4.2 | 4.1 | 4.2 | 4.1 | 5.2 | 5.0 | 4.9 | 5.1 | 4.0 | 3.85 | 5.1 | 4.7 | 4.15 |
| $B_2O_3$ | 2.5 | 2.45 | 2.4 | 2.45 | 2.4 | 2.45 | 2.45 | 2.45 | 2.4 | 1.45 | — | 2.45 | 2.35 | 2.4 | 2.4 | 2.3 | 2.25 | 2.4 | 2.2 | 2.4 |
| PbO | 3.2 | 4.2 | 9.2 | 4.75 | 7.75 | 6.2 | 4.7 | 3.15 | 9.2 | 3.15 | 7.6 | 3.1 | 9.1 | 14.8 | 9.3 | 5.95 | 8.6 | 3.05 | 8.55 | 9.35 |
| F | 2.2 | 2.15 | 2.1 | 2.15 | 2.1 | 2.1 | 2.1 | 2.15 | 2.1 | 2.15 | 2.1 | 2.15 | 2.1 | 2.0 | 2.1 | 2.0 | 1.95 | 2.1 | 1.9 | — |
| SrO | — | — | — | — | — | — | — | — | — | — | — | — | — | — | — | — | — | — | — | — |
| Incls. | No | Few | Many | Few | Few | No | No | No | No | No | No | No | No | No | No | No | No | No | No | No |
| Opac. | Dense | Dense | Dense | Dense | Dense | Very Dense | Very Dense | Poor-Medium | Poor-Medium | Poor-Medium | Poor | Medium | Poor | Very Poor | Medium-Poor | Dense | Medium | Dense | Dense | Poor |
| Cryst. | — | — | Apatite + $Pb_3(PO_4)_2$ | Apatite | — | Apatite | Apatite | — | Apatite + $Pb_3(PO_4)_2$ | — | — | — | — | — | — | Apatite | Apatite | Apatite | Apatite | Apatite + $Pb_3(PO_4)_2$ |

| | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|
| $SiO_2$ | 56.7 | 56.6 | 54.9 | 58.5 | 58.1 | 57.2 | 57.0 | 56.6 | 57.6 | 54.0 | 53.1 | 56.15 | 55.7 | 57.9 | 57.4 | 56.4 | 54.4 | 56.5 | 59.3 |
| $Al_2O_3$ | 12.5 | 12.4 | 13.5 | 12.9 | 12.8 | 12.6 | 12.5 | 12.45 | 12.7 | 12.15 | 12.1 | 12.5 | 12.5 | 12.95 | 12.9 | 12.9 | 12.15 | 12.8 | 13.0 |
| CaO | — | 1.5 | 1.5 | 1.6 | 1.55 | 1.5 | — | — | — | 1.5 | 1.5 | 1.55 | 1.55 | 1.6 | 1.6 | 1.5 | 1.5 | 1.55 | 1.5 |
| BaO | 4.2 | 5.15 | 6.1 | 4.3 | — | — | 2.1 | — | — | 5.9 | 5.9 | 6.1 | 6.1 | 6.3 | 6.3 | 5.9 | 5.9 | 6.25 | 6.15 |
| $Na_2O$ | 8.0 | 8.0 | 7.8 | 8.25 | 8.2 | 8.1 | 8.05 | 8.0 | 8.1 | 7.6 | 7.6 | 7.85 | 7.8 | 8.1 | 8.1 | 8.1 | 7.6 | 8.0 | 7.0 |
| $K_2O$ | 3.2 | 3.2 | 3.1 | 3.3 | 0.65 | 0.65 | 1.9 | 1.9 | 3.25 | 3.0 | 3.0 | 3.05 | 3.1 | 3.2 | 3.2 | 3.2 | 3.0 | 1.85 | 3.15 |
| $P_2O_5$ | 4.05 | 4.0 | 4.9 | 4.2 | 4.15 | 4.1 | 4.1 | 4.05 | 4.1 | 3.8 | 3.75 | 3.9 | 3.9 | 4.0 | 4.0 | 4.0 | 3.75 | 4.0 | 4.25 |
| $B_2O_3$ | 2.4 | — | 2.3 | 2.45 | 2.4 | 2.4 | 2.4 | 2.35 | 2.4 | 2.2 | 2.2 | 2.3 | 2.3 | 2.4 | 2.4 | 2.4 | 2.25 | 2.35 | 2.5 |
| PbO | 9.1 | 9.1 | 5.9 | 3.1 | 9.3 | 9.2 | 9.15 | 9.1 | 6.15 | 8.8 | 8.75 | 6.0 | 6.0 | 3.1 | 3.1 | 3.1 | 8.8 | 6.15 | 3.2 |
| F | — | — | 2.0 | 2.15 | 2.1 | 2.1 | 2.1 | 2.05 | 2.1 | 2.0 | 2.0 | 2.05 | 2.05 | 2.1 | 2.1 | 2.1 | 2.0 | 2.1 | 2.2 |
| SrO | — | — | — | 1.5 | 2.9 | 4.3 | 2.85 | 5.65 | 5.75 | — | — | — | — | — | — | — | — | — | — |
| ZnO | — | — | — | — | — | — | — | — | — | 0.55 | 2.1 | 0.6 | 1.1 | 0.6 | 1.15 | 2.25 | 0.55 | 0.6 | — |
| $As_2O_3$ | — | — | — | — | — | — | — | — | — | 0.1 | 0.1 | 0.1 | 0.1 | 0.1 | 0.1 | 0.1 | 0.1 | 0.1 | — |
| Incls. | No | No | No | No | No | No | No | No | No | No | No | No | No | No | No | No | No | No | No |
| Opac. | Clear | Poor | Very Dense | Dense | Dense | Dense | Dense | Dense | Very Dense | Medium | Poor-Medium | Dense | Dense | Dense | Dense | Medium | Medium | Very Dense | Dense |
| Cryst. | — | — | Apatite | Apatite | Apatite | Apatite | Apatite | Apatite + $Pb_3(PO_4)_2$ | Apatite + $Pb_3(PO_4)_2$ | — | — | Apatite | Apatite + $Pb_3(PO_4)_2$ | Apatite | Apatite | — | — | Apatite | Apatite |

TABLE IA

|  | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| $SiO_2$ | 65.2 | 65.2 | 65.2 | 65.2 | 69.5 | 69.5 | 69.5 | 69.5 | 69.3 | 69.5 | 69.5 | 69.5 | 69.5 | 69.5 | 69.5 | 69.5 | 69.5 | 69.6 | 69.5 |
| $Al_2O_3$ | 10.1 | 10.1 | 10.1 | 10.1 | 9.0 | 9.0 | 9.0 | 9.0 | 9.1 | 9.0 | 9.0 | 9.0 | 9.0 | 9.0 | 9.0 | 9.0 | 9.0 | 9.4 | 9.0 |
| CaO | 4.8 | 3.8 | 2.8 | 1.0 | 2.0 | 2.0 | 2.0 | 2.0 | 2.1 | 1.0 | — | 2.0 | 1.0 | — | 2.0 | — | — | 2.2 | 2.0 |
| BaO | — | — | — | — | 3.0 | 3.0 | 3.0 | 3.0 | 3.1 | 3.0 | 3.0 | 2.0 | 1.0 | — | 2.0 | 1.0 | — | 3.0 | 3.0 |
| $Na_2O$ | 9.2 | 9.2 | 9.2 | 9.2 | 9.5 | 9.5 | 9.5 | 9.5 | 9.8 | 9.5 | 2.0 | 9.5 | 9.5 | 9.5 | 9.5 | 9.5 | 9.5 | 9.0 | 9.5 |
| $K_2O$ | 1.4 | 1.4 | 1.4 | 1.4 | 2.5 | 2.5 | 2.5 | 2.5 | — | 2.5 | 9.5 | 2.5 | 2.5 | 2.5 | 2.5 | 2.5 | 2.5 | — | 1.5 |
| $P_2O_5$ | 2.1 | 2.1 | 2.1 | 2.1 | 2.1 | 2.1 | 2.1 | 2.1 | 2.1 | 2.1 | 2.5 | 2.1 | 2.1 | 2.1 | 2.1 | 2.1 | 2.1 | 2.1 | 2.1 |
| $B_2O_3$ | 3.3 | 3.3 | 3.3 | 3.3 | 2.5 | 2.5 | 2.5 | 2.5 | 2.7 | 2.5 | 2.1 | 2.5 | 2.5 | 2.5 | 2.5 | 2.5 | 2.5 | 2.7 | 2.5 |
| PbO | 1.0 | 2.0 | 3.0 | 1.0 | 1.0 | 2.0 | 3.0 | 5.0 | 1.0 | 1.0 | 2.5 | 1.0 | 2.0 | 3.0 | 2.0 | 3.0 | 5.0 | 2.0 | 1.0 |
| F | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 |
| MgO | 1.5 | 1.5 | 1.5 | 1.5 | — | — |  |  |  |  |  |  |  |  |  |  |  |  |  |

|  | 20 | 21 | 22 | 23 | 24 | 25 | 26 | 27 | 28 | 29 | 30 | 31 | 32 | 33 | 34 | 35 | 36 | 37 | 38 |
|---|---|---|---|---|---|---|---|---|---|---|---|---|---|---|---|---|---|---|---|
| $SiO_2$ | 69.5 | 69.5 | 69.5 | 69.5 | 69.5 | 69.5 | 69.5 | 69.5 | 69.5 | 69.5 | 69.5 | 69.5 | 69.5 | 69.5 | 69.5 | 69.5 | 69.0 | 69.0 | 69.0 |
| $Al_2O_3$ | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 |
| CaO | 2.0 | 2.0 | 2.0 | 2.0 | 2.0 | 1.8 | 1.6 | 1.4 | 2.0 | 2.0 | 1.76 | 1.82 | 2.0 | 2.0 | 2.0 | 2.0 | 1.5 | 0.5 | — |
| BaO | 3.0 | 3.0 | 3.0 | 3.0 | 3.0 | 3.0 | 3.0 | 3.0 | 3.0 | 3.0 | 1.64 | 2.73 | 2.5 | 1.5 | 3.0 | 3.0 | 2.5 | 1.5 | — |
| $Na_2O$ | 9.5 | 8.5 | 7.5 | 9.0 | 8.5 | 7.7 | 6.9 | 6.1 | 7.2 | 6.4 | 8.4 | 8.67 | 9.5 | 9.5 | 9.5 | 9.5 | 9.5 | 9.5 | 9.5 |
| $K_2O$ | 0.5 | 2.5 | 2.5 | 2.0 | 1.5 | 1.5 | 1.5 | 1.5 | 0.5 | 0.5 | 2.2 | 2.28 | 2.0 | 1.5 | 1.0 | 2.5 | 2.5 | 2.5 | 2.5 |
| $P_2O_5$ | 2.1 | 2.1 | 2.1 | 2.1 | 2.1 | 2.1 | 2.1 | 2.1 | 2.1 | 2.1 | 2.1 | 2.1 | 2.1 | 2.1 | 2.1 | 2.1 | 2.6 | 2.6 | 2.6 |
| $B_2O_3$ | 2.5 | 2.5 | 2.5 | 2.5 | 2.5 | 2.5 | 2.5 | 2.5 | 2.5 | 2.5 | 2.5 | 2.5 | 2.5 | 2.5 | 1.5 | — | 2.5 | 2.5 | 2.5 |
| PbO | 2.0 | 1.0 | 2.0 | 1.0 | 2.0 | 1.0 | 2.0 | 3.0 | 1.5 | 2.5 | 2.0 | 1.5 | 1.0 | 3.0 | 1.0 | 2.5 | 1.0 | 3.0 | 5.0 |
| F | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 |

|  | 39 | 40 | 41 | 42 | 43 | 44 | 45 | 46 | 47 | 48 | 49 | 50 | 51 | 52 | 53 | 54 | 55 | 56 |
|---|---|---|---|---|---|---|---|---|---|---|---|---|---|---|---|---|---|---|
| $SiO_2$ | 69.0 | 69.5 | 69.5 | 69.0 | 69.0 | 69.5 | 69.5 | 69.5 | 69.5 | 69.5 | 69.5 | 69.5 | 69.5 | 69.5 | 69.5 | 68.66 | 67.66 | 69.16 |
| $Al_2O_3$ | 9.0 | 10.0 | 10.5 | 9.5 | 10.5 | 9.0 | 9.0 | 9.0 | 9.0 | 9.0 | 9.0 | 9.0 | 9.0 | 9.0 | 9.0 | 9.1 | 9.1 | 9.1 |
| CaO | 2.0 | 2.0 | 2.0 | 2.0 | 2.0 | 2.0 | — | 2.0 | 2.0 | 2.0 | 2.0 | — | — | — | — | 2.02 | 2.02 | 2.02 |
| BaO | — | 3.0 | 3.0 | 3.0 | 3.0 | — | 2.0 | 2.5 | 2.5 | 3.0 | — | — | 1.0 | — | — | 2.95 | 2.95 | 2.95 |
| $Na_2O$ | 9.5 | 9.5 | 9.5 | 9.5 | 9.5 | 9.5 | 9.5 | 9.5 | 9.5 | 9.5 | 9.5 | 9.5 | 9.5 | 9.5 | 9.5 | 9.37 | 9.37 | 9.37 |
| $K_2O$ | 2.5 | 2.5 | 2.5 | 2.5 | 2.5 | 2.5 | 2.5 | 2.5 | 2.5 | 2.5 | 0.5 | 0.5 | 1.5 | 1.5 | 2.5 | 2.41 | 2.41 | 2.41 |
| $P_2O_5$ | 2.6 | 2.1 | 2.1 | 2.6 | 2.6 | 2.1 | 2.1 | 2.1 | 2.1 | 2.1 | 2.1 | 2.1 | 2.1 | 2.1 | 2.1 | 2.02 | 2.02 | 2.02 |
| $B_2O_3$ | 2.5 | 2.5 | 2.5 | 2.5 | 2.5 | 2.5 | 2.5 | — | 2.5 | 2.5 | 2.5 | 2.5 | 2.5 | 2.5 | 2.5 | 2.44 | 2.44 | 2.44 |
| PbO | 3.0 | 2.0 | 3.0 | 1.0 | 3.0 | 3.0 | 3.0 | 3.0 | 3.0 | 3.0 | 3.0 | 3.0 | 3.0 | 4.0 | 3.0 | 3.0 | 3.0 | 3.0 |
| F | 8.0 | 8.0 | 8.0 | 8.0 | 8.0 | — | — | — | 4.0 | 8.0 | 8.0 | 8.0 | 8.0 | 8.0 | 8.0 | 8.0 | 8.0 | 8.0 |
| SrO |  |  |  |  |  |  |  |  | — | 3.0 | 3.0 | 3.0 | 3.0 | 3.0 | 4.0 | — |  |  |
| ZnO |  |  |  |  |  |  |  |  |  |  |  |  |  |  |  | 1.0 | 2.0 | 0.52 |
| $As_2O_3$ |  |  |  |  |  |  |  |  |  |  |  |  |  |  |  | 0.036 | 0.036 | 0.036 |

|  | 57 | 58 | 59 | 60 | 61 | 62 | 63 |
|---|---|---|---|---|---|---|---|
| $SiO_2$ | 68.66 | 69.16 | 68.66 | 67.66 | 69.16 | 68.16 | 69.5 |
| $Al_2O_3$ | 9.1 | 9.1 | 9.1 | 9.1 | 9.1 | 9.1 | 9.0 |
| CaO | 2.02 | 2.02 | 2.02 | 2.02 | 2.02 | 2.02 | 1.88 |
| BaO | 2.95 | 2.95 | 2.95 | 2.95 | 2.95 | 2.95 | 2.82 |
| $Na_2O$ | 9.37 | 9.37 | 9.37 | 9.37 | 9.37 | 9.37 | 7.45 |
| $K_2O$ | 2.41 | 2.41 | 2.41 | 2.41 | 2.41 | 1.41 | 2.35 |
| $P_2O_5$ | 2.02 | 2.02 | 2.02 | 2.02 | 2.02 | 2.02 | 2.1 |
| $B_2O_3$ | 2.44 | 2.44 | 2.44 | 2.44 | 2.44 | 2.44 | 2.5 |
| PbO | 2.0 | 1.0 | 1.0 | 1.0 | 3.0 | 2.0 | 1.0 |
| F | 8.0 | 8.0 | 8.0 | 8.0 | 8.0 | 8.0 | 8.0 |
| ZnO | 1.0 | 0.52 | 1.0 | 2.0 | 0.52 | 0.52 | — |
| $As_2O_3$ | 0.036 | 0.036 | 0.036 | 0.036 | 0.036 | 0.036 | — |

Table II records the emulsion liquidus, the high temperature crystallization liquidus, and the low temperature crystallization liquidus, each expressed in terms of °C., determined on a number of the exemplary compositions listed in Table I utilizing laser reflectance measurements, along with ΔT, defined as the interval between the emulsion liquidus and the high temperature crystalline liquidus, and a visual appraisal of the density of the opacity exhibited by each.

Table III reports those three liquidus values, ΔT, and visual opacity appraisals for the same glasses as recited in Table II except that PbO is absent from the compositions thereof. The batches for the glasses (designated with an A) were compounded, mixed, melted, poured into slabs, and the slabs annealed in like manner to the above-described laboratory procedure.

TABLE II

| Example | Emulsion Liquidus | High Temp. Liquidus | Low Temp. Liquidus | ΔT | Opacity |
|---|---|---|---|---|---|
| 2 | 1380 | 1315 | 800 | 65 | Medium |

TABLE II-continued

| Example | Emulsion Liquidus | High Temp. Liquidus | Low Temp. Liquidus | ΔT | Opacity |
|---|---|---|---|---|---|
| 4 | 1300 | 1210 | N.O.* | 90 | Poor |
| 5 | 1370 | 1310 | 730 | 60 | Dense |
| 6 | 1440 | 1380 | 800 | 60 | Dense |
| 12 | 1350 | 1275 | 700 | 75 | Poor |
| 13 | 1360 | 1300 | 660 | 60 | Medium |
| 14 | 1250 | 1200 | N.O.* | 50 | Medium |
| 30 | 1380 | 1315 | 770 | 65 | Very Dense |
| 31 | 1460 | 1400 | 880 | 60 | Very Dense |
| 32 | 1400 | 1320 | 720 | 80 | Poor-Medium |
| 40 | 1360 | 1305 | 770 | 55 | Dense |
| 48 | 1440 | 1390 | 780 | 50 | Dense |
| 51 | 1380 | 1300 | 890 | 80 | Dense |
| 52 | 1370 | 1300 | 940 | 70 | Dense |
| 61 | 1310 | 1230 | 820 | 80 | Medium |
| 63 | 1375 | 1315 | 800 | 60 | Dense |

*Not Observed

TABLE III

| Example | Emulsion Liquidus | High Temp. Liquidus | Low Temp. Liquidus | ΔT | Opacity |
|---|---|---|---|---|---|
| 2A | 1380 | 1350 | 840 | 30 | Medium |
| 4A | 1320 | 1290 | N.O.* | 30 | Medium |
| 5A | 1380 | 1350 | 760 | 30 | Dense |
| 6A | 1450 | 1430 | 820 | 20 | Dense |
| 12A | 1360 | 1330 | 720 | 30 | Medium |
| 13A | 1380 | 1350 | 650 | 30 | Medium |
| 14A | 1320 | 1300 | N.O.* | 20 | Medium |
| 30A | 1390 | 1370 | 800 | 20 | Dense |
| 31A | 1390 | 1375 | 880 | 15 | Dense |
| 32A | 1410 | 1390 | 775 | 20 | Dense |
| 40A | 1380 | 1350 | 790 | 30 | Dense |
| 48A | 1440 | 1415 | 800 | 25 | Very Dense |
| 51A | 1380 | 1360 | 880 | 20 | Dense |
| 52A | 1400 | 1360 | 900 | 40 | Medium-Dense |
| 61A | 1320 | 1275 | 840 | 45 | Medium |
| 63A | 1385 | 1360 | 800 | 25 | Dense |

*Not Observed

A comparison of Tables II and III illustrates that the inclusion of PbO raises the value of ΔT by at least 25° C. and sometimes over 50° C. It has been found that values of ΔT less than 40° C. generally result in the growth of apatite inclusions during the forming process (each of the glasses in Table III being subject thereto), accompanied with reduced mechanical and thermal strength.

Experience has also demonstrated that the presence of PbO in certain compositions may decrease the high temperature crystallization temperature to such a degree that opacity is reduced. That phenomenon is evidenced in a comparison of Examples 4 with 4A, 12 with 12A, and 32 with 32A, respectively. Although the mechanism underlying that phenomenon has not been fully characterized, the following explanation has been proposed. When ΔT becomes very large, the lowered glass viscosity at the high temperature crystallization liquidus results in lower diffusion rates for ions in the glass. That circumstance translates into reduced crystal growth and, consequently, decreased opacity. Increased density of opacity, however, can normally be readily restored via minor modifications in glass composition within the specified ranges of the constituents. The greatest opacity (without crystalline inclusions) appears to occur when ΔT is about 50°-60° C.

It can be observed that several of the exemplary compositions reported in Table I exhibited some $Pb_3(PO_4)_2$ crystallization. The occurrence of that crystallization is believed to be due to low levels of CaO, SrO, and/or BaO, note, for example, Examples 44, 49, 50, 52, and 53. The reduced quantities of those components decreases the solubility of $Pb_3(PO_4)_2$ in the glass.

In order to determine the resistance of the inventive glasses to detergent attack, the following tests were devised:

First, a 0.3% by weight aqueous solution of SUPER SOILAX detergent, marketed by Economics Laboratories, St. Paul, Minn., was heated to 95° C. and a sample of several of the exemplary compositions of Table I having the dimensions of 2"×1"×0.25" immersed therein for 96 hours. Table II reports the results of those tests in terms of lead release (Pb Release) derived from analyzing the detergent solution after the test. The standard promulgated by the Federal Drug Administration for food contact surfaces is a maximum lead release of 7 PPM (parts/million).

Second, a 0.3% by weight aqueous solutions of SUPER SOILAX detergent was prepared and heated to 95° C. in like manner to the above test procedure. A sample of several of the exemplary compositions of Table I having the dimensions of 2"×1"×0.25" was immersed into the solution for 96 hours, withdrawn from the solution, rinsed in tap water, and dried. At least a portion of the sample surface was coated with SPOTCHECK dye penetrant, marketed by Magnaflux Corporation, Chicago, Ill., and the dye allowed to rest thereon for 20 seconds. The dye was thereafter dried with a clean cloth and the surface then cleaned with a household cleansing powder for about 30 seconds. An (A) rating in the Detergent Test signifies that no stain was observed. A (B) rating indicates a light stain which can be removed with a cloth wetted with detergent. Table IV reports the results of tests conducted on several of the inventive glasses.

Also reported in Table IV are values of softening points (Soft. Pt.) in °C. where measured on several of the glasses.

TABLE IV

| | 1 | 2 | 5 | 6 | 7 | 9 | 18 | 19 | 20 | 21 |
|---|---|---|---|---|---|---|---|---|---|---|
| Pb Release | 1.0 | 1.12 | 1.0 | 1.2 | 0.92 | 3.5 | 1.6 | 1.22 | 1.3 | 1.05 |
| Detergent Test | A | A | A | A | B | B | A | A | A | A |
| Soft. Pt. | — | 835 | — | — | — | 810 | 802 | 785 | 771 | 810 |

| | 23 | 24 | 25 | 28 | 31 | 40 | 42 | 48 | 53 | 63 |
|---|---|---|---|---|---|---|---|---|---|---|
| Pb Release | 1.3 | 1.0 | 0.85 | 1.0 | 1.1 | 1.25 | 0.90 | 0.84 | 1.6 | 0.92 |
| Detergent Test | A | A | A | A | A | A | A | A | A | A |
| Soft. Pt. | 811 | 826 | 818 | — | 810 | — | 824 | 782 | 848 | 785 |

The most preferred composition is Example 63 from the standpoint of automatic pressing processing.

We claim:

1. A spontaneous opal glass exhibiting a dense white appearance, a softening point of at least 740° C., excellent chemical durability, a temperature interval between the high temperature crystallization liquidus and the emulsion liquids greater than 50° C., and containing as the predominant crystal phase a member selected from the group of $Ca_5F(PO_4)_3$, $Sr_5F(PO_4)_3$, $Ba_5F(PO_4)_3$, $(Ca_{5-x}Ba_x)F(PO_4)_3$ solid solution, $(Sr_{5-x}Ba_x)F(PO_4)_3$ solid solution, $(Ca_{5-x}Sr_x)F(PO_4)_3$ solid solution, $(Sr_{5-x}Ca_x)F(PO_4)_3$ solid solution, $(Ba_{5-x}Ca_x)F(PO_4)_3$ solid solution, and $(Ba_{5-x}Sr_x)F(PO_4)_3$ solid solution, said glass consisting essentially, expressed in terms of weight percent on the oxide basis, of

| | | | |
|---|---|---|---|
| $SiO_2$ | 50-63 | $Na_2O$ | 5.5-10 |
| $Al_2O_3$ | 10-14 | $K_2O$ | 0-10 |
| $P_2O_5$ | 3.5-7 | BaO | 0-10 |
| PbO | 2-12 | CaO | 0-2.5 |
| $B_2O_3$ | 1-4 | SrO | 0-8 |
| F | 1.5-4 | BaO + CaO + SrO At Least 3 mole % | |

2. A spontaneous opal glass according to claim 1 containing 3-4% PbO.

3. A spontaneous opal glass according to claim 1 wherein $Na_2O + K_2O < 13\%$.

* * * * *